US007925983B2

(12) United States Patent
Bangor et al.

(10) Patent No.: US 7,925,983 B2
(45) Date of Patent: Apr. 12, 2011

(54) SYSTEM AND METHOD FOR ADDRESS STORAGE AND MESSAGE ADDRESSING

(75) Inventors: Aaron Bangor, Austin, TX (US); Melody Woan-Shiang Ho Tang, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1127 days.

(21) Appl. No.: 10/673,673

(22) Filed: Sep. 29, 2003

(65) Prior Publication Data

US 2005/0068939 A1 Mar. 31, 2005

(51) Int. Cl.
*G06F 3/00* (2006.01)

(52) U.S. Cl. ........................................ 715/752; 715/751

(58) Field of Classification Search .................. 715/752, 715/751

See application file for complete search history.

(56) References Cited

U.S. PATENT DOCUMENTS 6,014,135 A * 1/2000 Fernandes ..................... 715/744
6,438,217 B1 8/2002 Huna
6,574,599 B1 6/2003 Lim et al.
6,704,396 B2 * 3/2004 Parolkar et al. ............ 379/88.17
7,072,943 B2 * 7/2006 Landesmann ................. 709/206
7,127,232 B2 * 10/2006 O'Neil et al. ................. 455/408
7,315,613 B2 * 1/2008 Kleindienst et al. ....... 379/88.13
7,487,456 B2 * 2/2009 Brooke et al. ................ 715/752
2002/0160757 A1 * 10/2002 Shavit et al. .................. 455/414
2003/0069874 A1 * 4/2003 Hertzog et al. .................... 707/1
2003/0098892 A1 * 5/2003 Hiipakka ...................... 345/846
2004/0119761 A1 * 6/2004 Grossman et al. ............ 345/854

OTHER PUBLICATIONS

Padwick, "Special Edition Using Microsoft Outlook 2000", Que, May 12, 1999, "Creating a Message", pp. 1-27.*
International Search Report for International Application No. PCT/US04/26940, mailed on Feb. 22, 2006.
Written Opinion of the International Searching Authority for International Application No. PCT/US04/26940, mailed on Feb. 22, 2006.

* cited by examiner

*Primary Examiner* — William L Bashore
*Assistant Examiner* — David Phantana-angkool
(74) *Attorney, Agent, or Firm* — Toler Law Group

(57) ABSTRACT

A system and method for message addressing and address storage are disclosed. A system incorporating teachings of the present disclosure may include an address menu having an identification field with more than one associated address fields. Each of the address fields may be maintaining addresses for different messaging receipt options. For example, if an intended recipient of a message has an email account and a facsimile machine, a first address field may maintain an email address for the recipient, and a second address field may maintain a facsimile number for the recipient.

20 Claims, 3 Drawing Sheets

SYSTEM AND METHOD FOR ADDRESS STORAGE AND MESSAGE ADDRESSING

FIELD OF THE DISCLOSURE

The present disclosure relates to messaging, and more particularly to a system and method for address storage and message addressing.

BACKGROUND OF THE DISCLOSURE

Web-based and personal-computer-based email software allows users to attach files to email messages and to "send" those messages. A typical user interface for a Web-based email client has a text box into which a user can type a filename of the attachment and an address box into which a user can type an address for a designated recipient of the message and attached file.

Adjacent to the file attachment text box is often a button labeled "Browse", which provides an alternative to typing the file name into the text box. The "Browse" button triggers an operating system's file browsing feature to enable a user to select one file. In response to a file being selected, a full path name of the file is automatically populated in the text box. Thereafter, the user clicks on a second button to upload the file to a Web server. The user may follow the above procedure to add another file.

Adjacent to the address box is often a button labeled "To", which provides an alternative to typing the address into the address box. The "To" button triggers an electronic address book browsing feature to enable a user to select an addressee. In response to an addressee being selected, an email address is automatically populated in the text box. After the address box is updated, the user may follow the above procedure to add another email address in the address box.

BRIEF DESCRIPTION OF THE DRAWINGS

The present disclosure is pointed out with particularity in the appended claims. However, other features are described in the following detailed description in conjunction with the accompanying drawing in which:

DETAILED DESCRIPTION OF THE DRAWINGS

Figure 1:
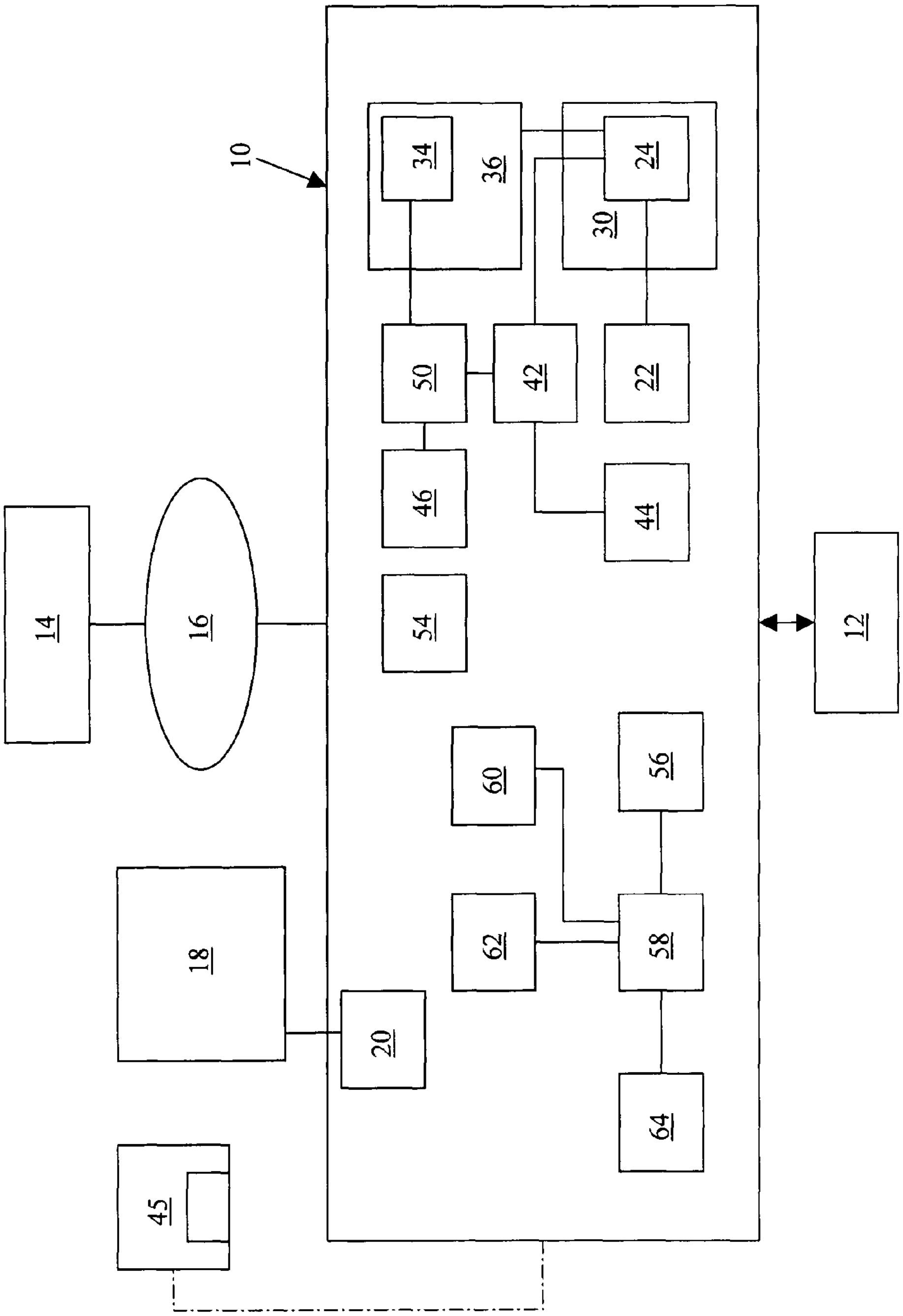
FIG. 1 presents a block diagram of an embodiment of a messaging system incorporating teachings of the present disclosure.

User testing has shown that the aforementioned uploading and addressing processes are overly complicated and error prone for many users. The text box induces many users to type an incomplete filename or address rather than to use the "Browse" or "To" button. Further, the labels may not be well understood by users. With regard to file attachment, after a file has been selected, many users fail to select the second button to upload the file. Instead, they click the third button to complete the process. Additionally, some operating systems currently limit only one file to be uploaded at a time. With address messaging, many users fail to include all of the intended addressees. In addition, many addressees have multiple email accounts or messaging receipt options, which may not be accounted for in a user's address book.

Embodiments of the present disclosure address the aforementioned issues. The embodiments may also address several additional issues. For example, an intended addressee may be reachable through several mechanisms. The addressee may have one or more email accounts, a cellular telephone, a wireline telephone, a facsimile machine, and/or other electronic devices capable of receiving information. Each of these messaging receipt options may have an associated address.

In an embodiment, the "Browse" button may be given a different label, such as "Find File to Attach". This new label may provide a better indication of the function of the button and why a user should select the button. Further, the text box may be removed so that users do not mistakenly enter an incomplete filename. Optionally, once a file has been selected in an operating system's file browser, the file may be automatically uploaded to a Web server without having to click an "Add" button or another manual act. This makes uploading multiple files at a time easier for the users. Another option includes uploading multiple files in the list box when an "Attach Files" button is clicked.

The resulting graphical user interface reduces a number of steps needed to upload local files to a Web site, eliminates confusing user interface objects, and more easily allows multiple local files to be selected and uploaded at once. Thus, the user experience is made simpler and less error prone.

An embodiment may also provide an address book with multiple entries for a given contact or potential addressee. The address book may launch in response to a user depressing an address book link button, the "To" button, the "Cc" button, and/or the "Bcc" button. The address book may present a user with a simplified interface for addressing an outgoing message. In one embodiment, the multiple entries may represent destinations for an intended recipient that may be other than or in addition to an email account. For example, an intended recipient may have one or more email accounts, a cellular telephone, a wireline telephone, an instant messaging (IM) account, a facsimile machine, and/or other electronic devices or services capable of facilitating the exchange of information.

The address book may include several identification fields, which may identify individual contacts, who may be potential addressees or message recipients. Each identification field may have associated address fields maintaining contact information for various messaging receipt options for the individual contact presented in the identification field.

As mentioned above, a user may launch the address book by depressing, for example, the "To" button. The user may select several addresses representing messaging receipt options for an intended recipient or collection of intended recipients. Optionally, once an option has been selected, the address may automatically appear in the address box. This may provide nearly immediate feedback to the user as to the addresses selected. Another option includes populating the address box with all selected addresses when the address book is closed or the user selects "done".

The resulting graphical user interface allows a user to easily populate the address box of an outgoing message. The interface also facilitates communication with an intended recipient by easily addressing a message to more than one messaging receipt option for the intended recipient. For example, a message may be easily addressed to an intended recipient's email account and facsimile machine. Thus, the user experience is made simpler and less error prone.

An embodiment of the present disclosure is described with reference to FIG. 1, which presents a block diagram of an embodiment of a messaging system incorporating teachings of the present disclosure, and FIG. 2, which is a flow chart of an embodiment of a messaging method. In the embodiment of FIG. 1, a computer 10 may be accessed by a user 12. User 12 may desire to send a message with multiple attachments to one or more intended recipients having several messaging receipt options. Each of the messaging options may have an alias or address associated therewith. One of the messaging options may be an email account associated with another computer 14. Computer 14 may be accessible via network 16.

Examples of computer 10 include, but are not limited to, a desktop computer, a notebook computer, a tablet computer, a smart telephone, and a personal digital assistant. Examples of computer 14 include, but are not limited to, a peer computer, a server computer, and an email server computer. In one embodiment, computer 14 provides a Web site that provides email functionality and/or other messaging functionality. Examples of computer network 16 include, but are not limited to, the Internet, an intranet, an extranet, a local area network, and a wide area network. Network 16 may be made up of or include wireless networking elements like 802.11(x) networks, cellular networks, and satellite networks. Network 16 may be made up of or include wired networking elements like the Public Switched Telephone Network (PSTN) and cable networks.

A method incorporating teachings of the present disclosure may include providing a graphical user interface (GUI) using computer 10. The GUI may allow user 12 to select which file(s) to upload, and to initiate the upload. The GUI may also allow user 12 to select addresses for one or more messaging receipt options for one or more chosen recipients.

To facilitate attaching files, the GUI may include a user-selectable button 22 having associated text that includes a verbal of the word "attach". A verbal is defined as a group of words derived from a verb. The verbal may include the verb, an infinitive of the verb or a gerund of the verb. In general, the infinitive includes the word "to", and the gerund includes the word "for".

The infinitive of "attach" may have an adjectival-use form, a noun-use form, or an adverbial-use form. Regardless of which of the three forms is used, the infinitive may have either an active voice or a passive voice. TABLE I shows examples of text associated with the user-selectable button 22 using the various infinitives of "attach". In one embodiment, the text includes an active voice, adjectival form of the infinitive of "attach", such as "Find file to attach" or "Find files to attach".

TABLE I

| Verbal | Form | Voice | Text associated with button |
|---|---|---|---|
| Infinitive | Adjectival | Active | Find file to attach |
| Infinitive | Adjectival | Passive | Find file to be attached |
| Infinitive | Noun | Active | Find file which to attach |
| Infinitive | Noun | Passive | Find file which is to be attached |
| Infinitive | Adverbial | Active | Find file you want to attach |
| Infinitive | Adverbial | Passive | Find file you want to be attached |
| Gerund | | | Find file for attaching |

As an alternative of the infinitive, the gerund of "attach" may be used. The gerund form may include "for attaching". Thus, the text associated with the user-selectable button 22 may be "Find file for attaching" or "Find files for attaching".

In response to receiving a selection of user-selectable button 22 from user 12, an act of initiating a GUI element 24 may be performed. In one embodiment, GUI element 24 may be a file browser of an operating system (OS) 30 of computer 10. In general, GUI element 24 may include a message input box. GUI element 24 may allow user 12 to find one or more files to attach to a message, such as an email message.

Computer 10 may facilitate receiving a selection of one or more files 34 by user 12 using GUI element 24. The selected files 34 may be present on a computer-readable medium 36 associated with computer 10. Examples of computer-readable medium 36 include, but are not limited to, a magnetic medium such as a hard disk or a floppy disk, an optical medium such as an optical disk (e.g. a CD or a DVD), or an electronic medium such as an internal electronic memory of computer 10 or a removable memory card.

Computer 10 may also include a display 18 for displaying a list 42 of selected file(s) 34 for view by user 12. Computer 10 may include a display engine 20 capable of initiating presentation of the messaging GUI and its elements on display 18. GUI element 24 may also present a user-selectable button 44 that allows user 12 to selectively remove one or more of the selected file(s) from list 42. User 12 may select a file to be removed by pointing and clicking on its entry in the list, and then selecting button 44. Alternatively, user 12 may scroll list 42 using scroll keys or a scroll wheel until a particular entry is highlighted, and then select button 44 to remove the file associated with the highlighted entry from list 42.

In one embodiment, the messaging GUI and/or GUI element 24 may also include a user-selectable button 46 having associated text that includes an imperative of "attach". In an embodiment, the text may consist of "Attach file" or "Attach files". User-selectable button 46 may initiate a processor 50 to upload selected files 34 to attach same to the message.

The selected files 34 may be uploaded in response to user 12 selecting button 46. Alternatively, each selected file may be automatically uploaded once user 12 has made its selection using GUI element 24, such as the file browser of the OS 30. In either case, selected files 34 may be uploaded from computer 10 to computer 14 via network 16. Optionally, the GUI may include a cancel button 54 which, if selected by user 12, may abort the act of uploading selected files 34. Instances of GUI items may be referred to as buttons in this disclosure. Buttons may be soft buttons, icons, and/or selectable portions of the GUI, and each of buttons, icons, and portions may be used interchangeably.

FIG. 1 further illustrates a computer readable media 45. Computer readable media 45 may be used to store instructions capable of executing the techniques described herein on a computer 10. Typically, computer readable media 45 may be a CD-ROM, a floppy, or a memory location. Memory locations may include memory sticks and mass storage devices. Mass storage devices may be connected directly to the computer 10, or may be network accessible.

As depicted in FIG. 1, to facilitate selection of intended recipient addresses, the messaging GUI may include a user-selectable button 56 having associated text such as "to". In response to receiving a selection of button 56, an act of initiating a GUI element 58 may be performed. In one embodiment, GUI element 58 may present an address menu such as an address book or list of addresses associated with contacts or potential message recipients.

The messaging GUI may include an address box, and GUI element 58 may present a user-selectable portion 60 having associated text that includes "email". User-selectable portion 60 may be capable of indicating a desire to add and/or initiating the addition of an email address for a chosen contact into the address box of the messaging GUI. GUI element 58 may also present a user-selectable portion 62 having associated text that includes "phone". User-selectable portion 62 may be capable of initiating the addition of a telephone number for a chosen contact into the address box of the messaging GUI. GUI element 58 may present additional items like user-selectable portion 64, which may be capable of initiating the addition of a facsimile number or an instant messaging (IM) address. Other addable addresses or alias may be available for short messaging services (SMS), enhanced messaging services (EMS), multimedia messaging services (MMS), and other wireless and/or wireline messaging options and services.

Figure 2:
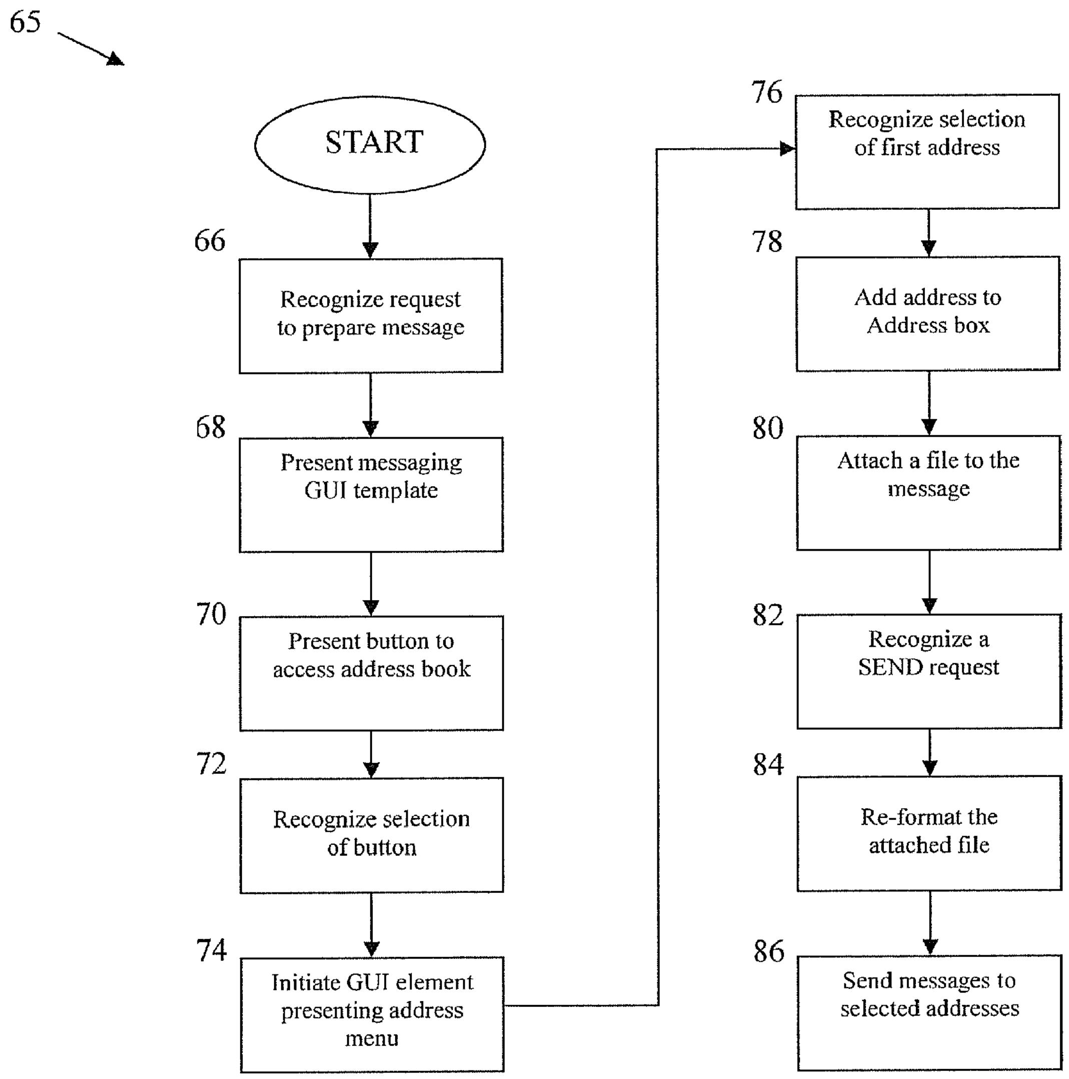
FIG. 2 presents a flow chart of an embodiment of a messaging method.

Operation of a system incorporating teachings of the present disclosure may be better understood by reference to FIG. 2. As mentioned above, FIG. 2 presents a flow chart of an embodiment of a messaging routine 65. At step 66 of routine 65, a user may have indicated a desire to generate an outgoing message. In response and at step 68, the user may be presented with a messaging GUI, which may look like the GUI presented in FIG. 3.

At step 70, the messaging GUI may be shown to include a user-selectable button that allows a user to initiate access to an address book or menu. The user may select the button and, at step 72, a system executing at least a portion of routine 65 may recognize the user selection. At step 74, the same or different system may initiate presentation of a GUI element within the messaging GUI being displayed to the user. The messaging element may present an address menu that includes several contacts. In preferred embodiments, the menu may present several addresses for each contact—the addresses may be associated with devices or services that allow the contact to have several messaging receipt options.

At step 76, the system may recognize selection of one of the addresses associated with a contact stored in the address menu. At step 78, the selected address may be added to an address box presented as a part of the messaging GUI. At step 80, the user may have selected a file to attach to the outgoing message being prepared, and the file may be attached.

In some embodiments, a system executing routine 65 may recognize that certain address types like email addresses or phone numbers may indicate the type of device a recipient will use to access the message. In such a system, a send request may be recognized at step 82 and an attached file may be re-formatted for a given address and associated device type at step 84. Routine 65 may be completed at step 86 when communication of the outgoing message is initiated.

Figure 3:
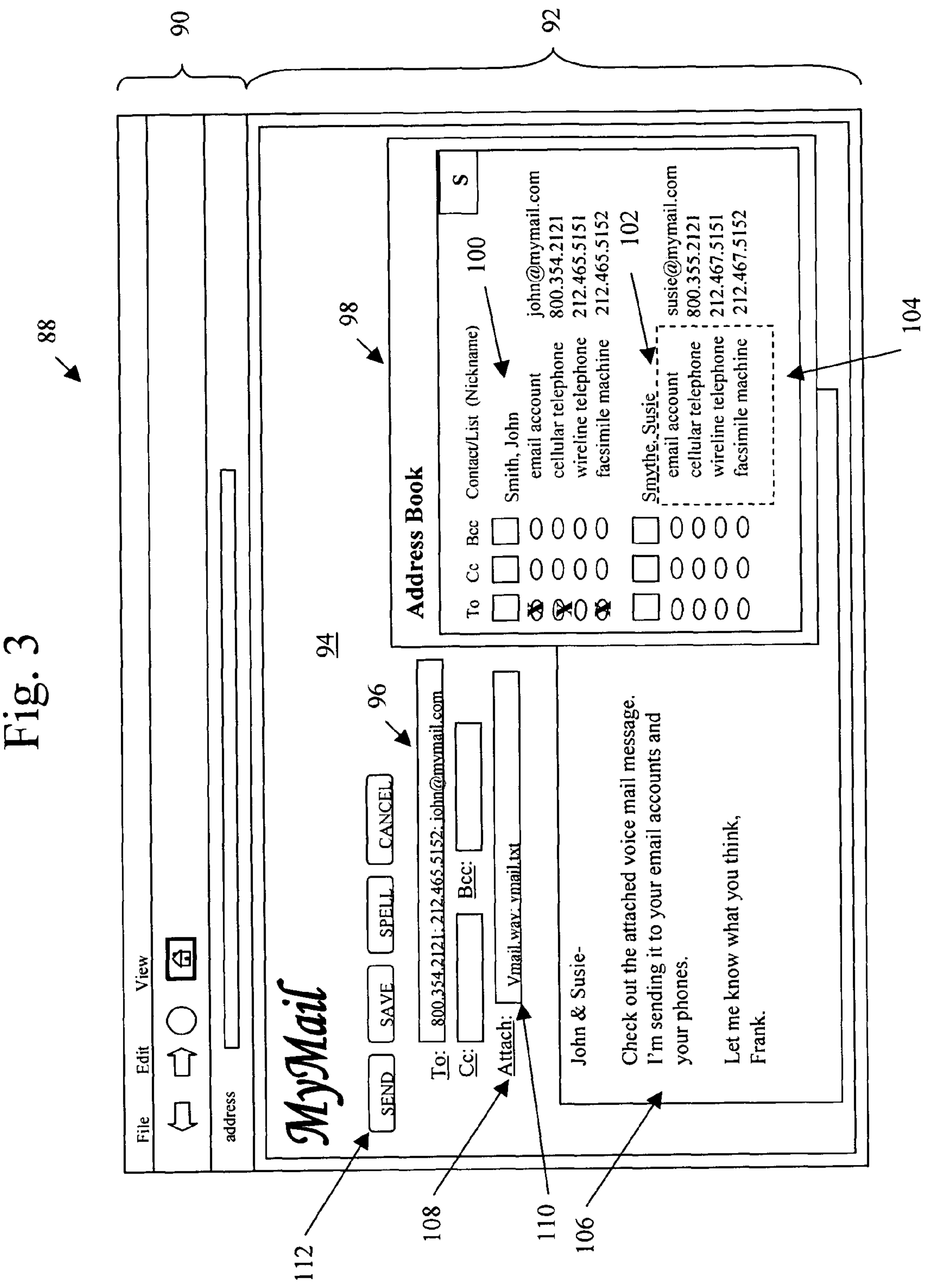
FIG. 3 presents an illustration of an embodiment of a graphical user interface to receive user commands for addressing messages in accordance with teachings of the present disclosure.

FIG. 3 presents an illustration of an embodiment of a system 88 presenting a graphical user interface for receiving user commands for addressing messages in accordance with teachings of the present disclosure. In operation, a computer like computer 10 of FIG. 1 may have a display capable of presenting a user with a browser or browser-like screen shot. The screen shot may include a browser bar portion 90 and a display window 92. In operation, a computer like computer 14 of FIG. 1 may send information representing messaging GUI 94 to computer 10. GUI 94 may be part of a unified communications Web site and may be sent to a computer like computer 10 of FIG. 1 via a network like network 16 of FIG. 1.

GUI 94 may include several display items like address box 96, which may be presented in connection with a user selectable button having associated text that includes "To". As shown in FIG. 3, GUI element 98 may launch in response to user selection of the "To" button. GUI element 98 may include several saved contacts of potential message recipients. As shown, GUI 98 is displaying the contacts saved under the "S" heading. The contacts include "Smith, John" presented in identification filed 100 and "Smythe, Susie" presented in identification field 102.

As shown, identification field 102 has four address fields 104, each containing addresses for different messaging receipt options. As shown, Ms. Smythe appears to be capable of receiving messages or information via email, facsimile, wireline telephone, and cellular telephone.

Messaging GUI 94 of FIG. 3 may be associated with a web-based messaging service entitled "MyMail", which may allow a user to send messages of differing types to different messaging receipt options of multiple intended recipients. The user may type in a text message into message input box 106. The user may also attach files by selecting user-selectable item 108 entitled "Attach".

As shown, the user appears to have attached two files "vmail.wav" and "vmail.txt". These two file names appear in an attached file box 110. In one embodiment, the user may have attached a .WAV file of a voicemail message to the outgoing message. The system may have recognized that one of the selected addresses appearing in address box 96 is associated with a facsimile machine. The system may "know" that the facsimile machine will not be able to easily receive a .WAV file. As a result, the system may convert the .WAV file into a text file that may be received by a facsimile machine. In operation, a user may select send button 112 and messages may be sent to each of the selected addresses with attached files in formats receivable by devices associated with the selected addresses.

The embodiment depicted in FIG. 3 shows a cascaded menu structure for GUI element 98. This structure may be presented in several other ways. For example, an address menu may be presented in a row-based format—where, for example, a contact name appears at the head of a row and the available messaging receipt options for that contact appear subsequent positions of the same row.

As shown in FIG. 3, buttons with associated text have the text depicted within the button. Either in addition to or as an alternative to having the associated text within each of the buttons, the associated text may be provided in another form. For example, each associated text may be included in a markup language tag associated with its corresponding one of the buttons. The associated text may be included in a value of an attribute, such as an ALT="text" attribute and/or a TITLE="text" attribute, of the tag. Using the tags or alternative types of computer code, a mouse-over event for any of the buttons may be able to cause its associated text to be displayed by the computer 10. Further, if the computer 10 is equipped with screen reader software and/or hardware, the associated text in the tag or alternative type of program code can be audibly displayed (e.g. speech synthesized) to the user 12. This assists blind users in using the GUI to upload files and to address outgoing messages. Those having ordinary skill will appreciate that markup languages such as hypertext markup language (HTML) and other computer languages can be used to provide the aforementioned tool-tip like functionality with or without using tags.

It will be apparent to those skilled in the art that the disclosure herein may be modified in numerous ways and may assume many embodiments other than the preferred forms specifically set out and described herein.

Accordingly, the above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A messaging system comprising:

a processor; and a memory device coupled to the processor, the memory device storing instructions for generating a graphical user interface, the graphical user interface operable to present:

an address menu having an identification field with a plurality of associated address fields, each of the plurality of associated address fields operable to maintain an address;

a selector to initiate presentation of the address menu at the graphical user interface for user selection of multiple addresses from the plurality of associated address fields of the identification field; and an address box associated with an outgoing electronic message, the address box capable of receiving one or more user-selected addresses from the plurality of associated address fields of the identification field for subsequent transfer of the outgoing electronic message to a respective destination associated with each of the one or more user-selected addresses;

wherein the messaging system is operable to:

automatically, without user interaction, convert a first file attached to the outgoing electronic message, the first file having an initial format, to produce a second file having a different format; and automatically attach the second file to the outgoing electronic message.

2. The messaging system of claim 1, wherein the identification field maintains a contact alias for a potential recipient of the outgoing electronic message.

3. The messaging system of claim 1, wherein the graphical user interface is further operable to present:

a first address menu for a first user and a second address menu for a second user; and an interface engine associated with the messaging system and operable to communicatively couple a remote computer associated with the first user to the messaging system.

4. The messaging system of claim 3, wherein the messaging system is operable to initiate communication of Internet protocol packets.

5. The messaging system of claim 1, wherein the identification field is operable to maintain a contact name, and wherein the plurality of associated address fields includes:

a first address field configured to store a first address associated with the contact name; and a second address field configured to store a second address associated with the contact name;

wherein the first address is one of an email address, a telephone number, an instant messaging address, a short messaging service address, an enhanced messaging service address, a multimedia messaging service address, and a facsimile number.

6. The messaging system of claim 1, wherein the initial format is a .wav format and the different format is a text format.

7. The messaging system of claim 1, further comprising displaying a first indicator indicating that the first file is attached to the outgoing electronic message and concurrently displaying a second indicator indicating that the second file is attached to the outgoing electronic message.

8. A method comprising:

initiating presentation of a first user-selectable item;

receiving a first signal indicating user selection of the first user-selectable item;

initiating, in response to the first signal, an address graphical user interface element to present an address menu comprising contact information of at least one potential addressee, the contact information of the at least one potential addressee including a first selectable address associated with a first address format type and a second selectable address associated with a second address format type;

initiating, in response to a selection of the first selectable address at the address menu, presentation of the first selectable address in an address box associated with an outgoing electronic message;

attaching a first file to the outgoing electronic message, the first file having an initial format;

automatically converting the first file to produce a second file having a different format, wherein the different format differs from the initial format, and attaching the second file to the outgoing electronic message; and formatting the outgoing electronic message, without user interaction, into a third format that is based at least in part on the first address format type.

9. The method of claim 8, further comprising:

receiving a second signal indicating a request to prepare the outgoing electronic message; and initiating presentation of a messaging graphical user interface to present a message composition template comprising the address box and a message input box.

10. The method of claim 8, further comprising:

modifying the address menu in response to a user input comprising addition of another potential addressee; and subsequently re-initiating the address graphical user interface element;

wherein the address menu comprises contact information for the at least one potential addressee and the another potential addressee.

11. The method of claim 8, further comprising:

recognizing a second selection of the second selectable address and, in response to the second selection, initiating presentation of the second selectable address in the address box associated with the outgoing electronic message; and formatting the outgoing electronic message, without user interaction, into a fourth format that is based in part on the second address format type.

12. The method of claim 8, wherein the initial format is a .wav format and the different format is a text format.

13. The method of claim 12, further comprising:

initiating presentation of a second user-selectable item associated with sending the outgoing electronic message to the first selectable address in the address box and to the second selectable address in the address box.

14. The method of claim 13, further comprising:

receiving a second signal indicating user selection of the second user-selectable item; and in response to receiving the second signal, initiating communication of the outgoing electronic message to the first selectable address and to the second selectable address.

15. The method of claim 8, wherein the different format is based at least in part on the first address format type.

16. The method of claim 8, further comprising displaying a first indicator indicating that the first file is attached to the outgoing electronic message and concurrently displaying a second indicator indicating that the second file is attached to the outgoing electronic message.

17. A non-transitory machine-readable storage medium including machine-executable instructions that, when executed by a machine, cause the machine to:

provide a user-selectable button in connection with preparation of an outgoing electronic message;

initiate a graphical user interface element in response to selection of the user-selectable button, the graphical user interface element enabling a user to select at least one address for the outgoing electronic message, the graphical user interface element comprising an address menu having an identification field with a plurality of associated address fields, each of the plurality of associated address fields operable to maintain an address;

receive a selection of a first address via the graphical user interface element, the first address associated with an address format type;

populate an address box of the outgoing electronic message with the first address;

attach a first file to the outgoing electronic message, the first file having an initial format;

automatically convert the first file to produce a second file, the second file having a different format that differs from the initial format, and attach the second file to the outgoing electronic message; and modify a third format of the outgoing electronic message, without user interaction, wherein the third format is based at least in part on the address format type.

18. The non-transitory machine-readable storage medium of claim 17, wherein the initial format is a .wav format and the different format is a text format.

19. The non-transitory machine-readable storage medium of claim 17, wherein the different format is based at least in part on the address format type.

20. The non-transitory machine-readable storage medium of claim 17, further comprising machine-executable instructions that, when executed, cause the machine to display a first indication that the first file is attached to the outgoing electronic message and to concurrently display a second indication that the second file is attached to the outgoing electronic message.

* * * * *